(12) United States Patent
Gillmore et al.

(10) Patent No.: US 9,387,985 B2
(45) Date of Patent: Jul. 12, 2016

(54) TAILGATE ASSEMBLY FOR A REFUSE VEHICLE

(71) Applicant: Oshkosh Corporation, Oshkosh, WI (US)

(72) Inventors: Jason Gillmore, Oshkosh, WI (US); Jarud Hoefker, Oshkosh, WI (US); Leslie Schwartz, Oshkosh, WI (US); Shashank Bhatia, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 205 days.

(21) Appl. No.: 14/140,231

(22) Filed: Dec. 24, 2013

(65) Prior Publication Data

US 2015/0175353 A1    Jun. 25, 2015

(51) Int. Cl.
*B65F 3/00* (2006.01)
*B60P 1/00* (2006.01)
*B60P 1/26* (2006.01)

(52) U.S. Cl.
CPC . *B65F 3/00* (2013.01); *B60P 1/003* (2013.01); *B60P 1/26* (2013.01)

(58) Field of Classification Search
CPC .............. B60P 1/26; B60P 1/02; B60P 1/267; B60P 1/273; B60P 1/48; B60P 1/483; B60P 1/486; B60P 1/003; B65F 3/00
See application file for complete search history.

(56) References Cited

U.S. PATENT DOCUMENTS

| | | | |
|---|---|---|---|
| 5,575,513 A * | 11/1996 | Tuttle | E05C 17/30 16/82 |
| 5,951,235 A | 9/1999 | Young et al. | |
| 6,149,374 A * | 11/2000 | Dershem | E02F 9/24 212/292 |
| 6,315,515 B1 | 11/2001 | Young et al. | |
| 6,336,783 B1 | 1/2002 | Young et al. | |
| 6,447,239 B2 | 9/2002 | Young et al. | |
| 6,565,305 B2 | 5/2003 | Schrafel | |
| 7,070,382 B2 | 7/2006 | Pruteanu et al. | |
| 7,284,943 B2 | 10/2007 | Pruteanu et al. | |
| 7,468,015 B2 | 12/2008 | Hirata et al. | |
| 7,556,468 B2 | 7/2009 | Grata | |
| 7,559,735 B2 | 7/2009 | Pruteanu et al. | |
| 7,578,379 B2 | 8/2009 | Gillmore et al. | |
| 7,648,015 B2 | 1/2010 | Gillmore et al. | |

(Continued)

FOREIGN PATENT DOCUMENTS

GB    2093902 A  *  9/1982  ............... B60P 1/26

OTHER PUBLICATIONS

U.S. Appl. No. 13/940,955, filed Jul. 12, 2013, Kuriakose.

(Continued)

*Primary Examiner* — Glenn Myers
(74) *Attorney, Agent, or Firm* — Foley & Lardner LLP

(57) ABSTRACT

A body assembly for a vehicle includes a storage body, a tailgate rotatably coupled to the storage body, an actuator, and a prop. The actuator includes a cylinder tube having an outer tube end coupled to the tailgate and a rod having an outer rod end coupled to the body. Extension and retraction of the actuator moves the tailgate between an open position and a closed position. The prop has an interface surface configured to selectively engage the cylinder tube. The rod end and the prop are rotatably coupled to a lower portion of the storage body such that an operator standing alongside the refuse vehicle may support the tailgate in the open position by directly engaging the prop.

20 Claims, 7 Drawing Sheets

(56) References Cited

U.S. PATENT DOCUMENTS

| | | |
|---|---|---|
| 7,878,750 B2 | 2/2011 | Zhou et al. |
| 8,182,194 B2 | 5/2012 | Pruteanu et al. |
| 8,215,892 B2 | 7/2012 | Calliari |
| 8,360,706 B2 | 1/2013 | Addleman et al. |
| 8,540,475 B2 | 9/2013 | Kuriakose et al. |
| 9,109,387 B2 * | 8/2015 | Oosawa ................ F16F 9/0254 |
| 2008/0048082 A1 * | 2/2008 | Pope ...................... B62D 25/12 248/354.5 |
| 2012/0282077 A1 | 11/2012 | Alberts et al. |
| 2013/0057007 A1 | 3/2013 | Howell et al. |
| 2013/0251485 A1 | 9/2013 | Howell et al. |

OTHER PUBLICATIONS

U.S. Appl. No. 13/958,308, filed Aug. 2, 2013, Gillmore et al.
U.S. Appl. No. 14/098,143, filed Dec. 5, 2013, Bhatia.
U.S. Appl. No. 14/185,705, filed Feb. 20, 2014, Ditty.
U.S. Appl. No. 14/209,483, filed Mar. 13, 2014, Yanming.

* cited by examiner

TAILGATE ASSEMBLY FOR A REFUSE VEHICLE

BACKGROUND

Refuse vehicles collect a wide variety of waste, trash, and other material from residences and businesses. Operators use the refuse vehicle to transport the material from various waste receptacles within a municipality to a storage or processing facility (e.g., a landfill, an incineration facility, a recycling facility, etc.). To reduce the requisite number of trips between the waste receptacles and the storage or processing facility, the refuse may be emptied into a collection chamber (e.g., a hopper) of the refuse vehicle and thereafter compacted. Such compaction reduces the volume of the refuse but imparts large packing forces on the tailgate of the refuse vehicle. Traditional refuse vehicles include locks positioned underneath the body assembly to secure the tailgate. Traditional refuse vehicles may also include a shaft that an operator positions between the body assembly and the tailgate to prop open the tailgate (e.g., to perform a maintenance operation). Other traditional refuse vehicles include a collar that is accessed with intermediate rods or tools to prop open the tailgate.

SUMMARY

One embodiment of the invention relates to a body assembly for a vehicle that includes a storage body, a tailgate rotatably coupled to the storage body, an actuator, and a prop. The actuator includes a cylinder tube having an outer tube end coupled to the tailgate and a rod having an outer rod end coupled to the body. Extension and retraction of the actuator moves the tailgate between an open position and a closed position. The prop has an interface surface configured to selectively engage the cylinder tube. The rod end and the prop are rotatably coupled to a lower portion of the storage body such that an operator standing alongside the refuse vehicle may support the tailgate in the open position by directly engaging the prop.

Another embodiment of the invention relates to a body assembly for a vehicle that includes a storage body, a tailgate gate rotatably coupled to the storage body, an actuator, and a prop. The actuator includes a cylinder tube having an outer tube end coupled to the tailgate and a rod having an outer rod end coupled to the body. Extension and refraction of the actuator moves the tailgate between an open position and a closed position. The prop includes an end wall that selectively engages the actuator and a sidewall that defines an aperture positioned to engage a prop retainer to secure the position of the prop.

Still another embodiment of the invention relates to a vehicle that includes a chassis, a storage body coupled to the chassis, a tailgate rotatably coupled to the storage body, an actuator, and a prop. The actuator includes a cylinder tube having an outer tube end coupled to the tailgate and a rod having an outer rod end coupled to the body. Extension and retraction of the actuator moves the tailgate between an open position and a closed position. The prop has an interface surface configured to selectively engage the cylinder tube. The rod and the prop are rotatably coupled to a lower portion of the storage body such that an operator standing alongside the refuse vehicle may support the tailgate in the open position by directly engaging the prop.

The invention is capable of other embodiments and of being carried out in various ways. Alternative exemplary embodiments relate to other features and combinations of features as may be recited in the claims.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
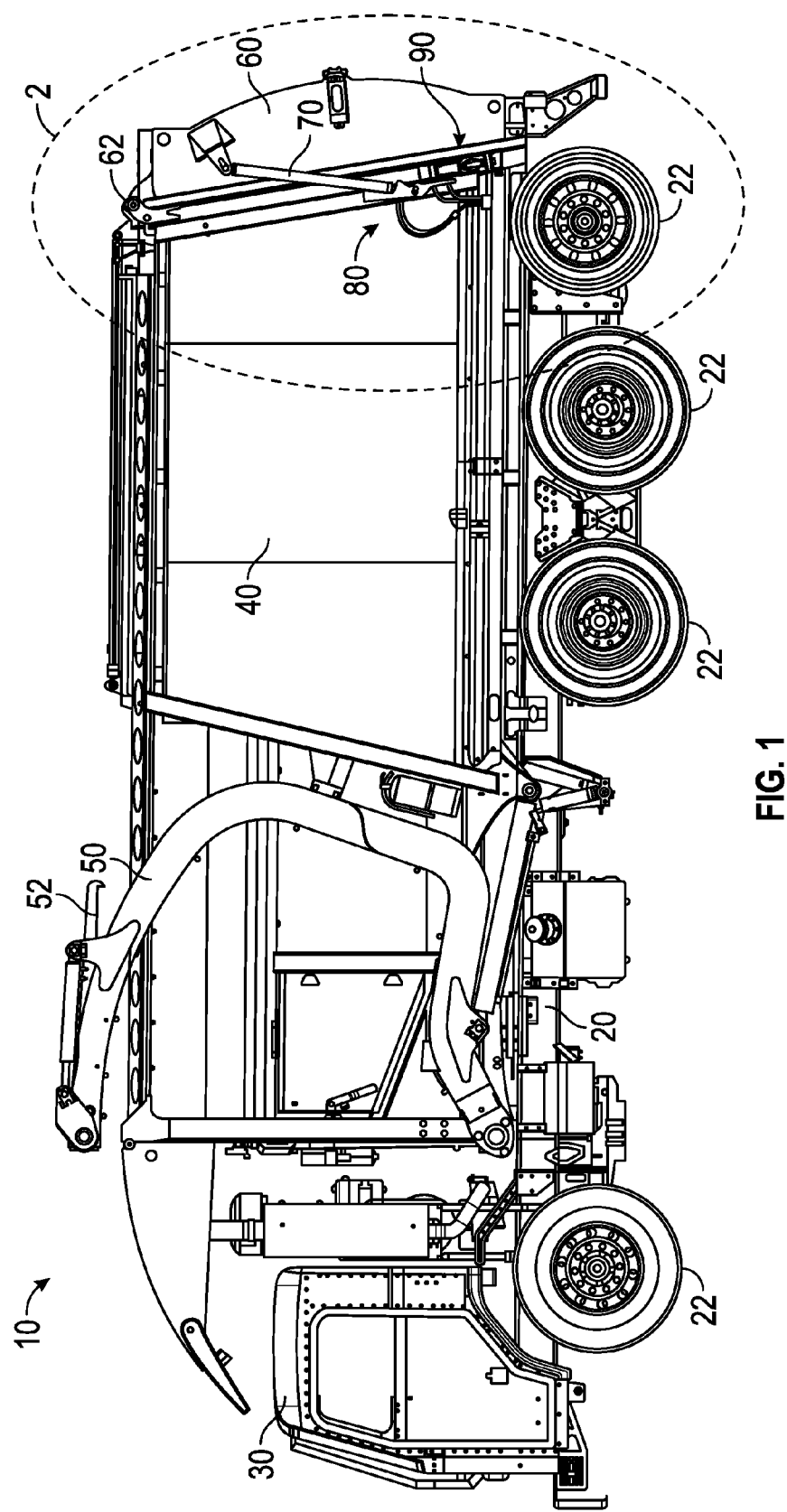
FIG. 1 is a side plan view of a refuse vehicle having a prop assembly and a lock mechanism, according to an exemplary embodiment.
Figure 2:
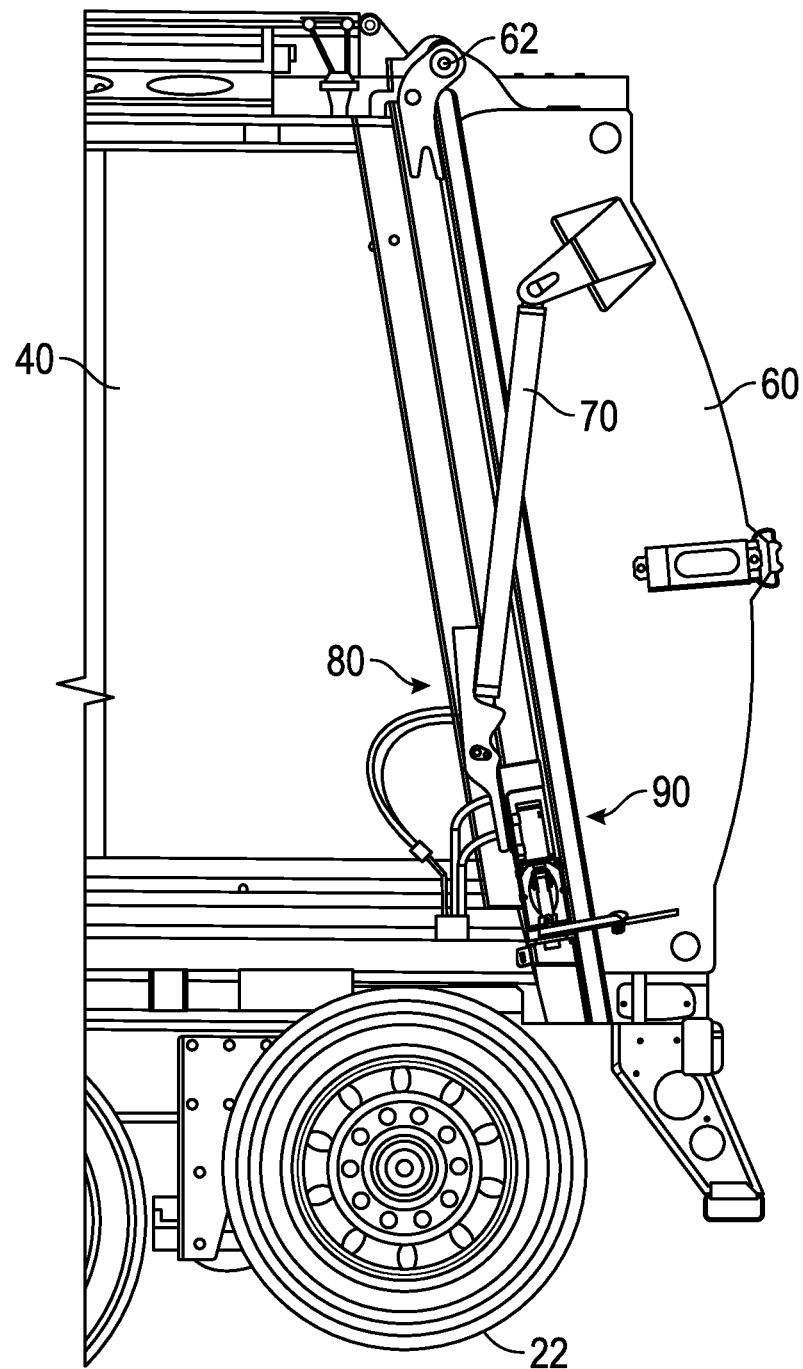
FIG. 2 is a detail view of a refuse vehicle having a prop assembly and a lock mechanism, according to an exemplary embodiment.

Referring to the exemplary embodiment shown in FIGS. 1-2, a vehicle, shown as refuse truck 10 (e.g., garbage truck, waste collection truck, sanitation truck, etc.), includes a chassis, shown as chassis 20. Chassis 20 includes a pair of longitudinal frame rails extending along the length of refuse truck 10, according to an exemplary embodiment. In one embodiment, chassis 20 includes a prime mover (e.g., an internal combustion engine, an electric motor, etc.), a drive train, hydraulic components (e.g., a hydraulic pump, etc.), and still other components to facilitate the operation of refuse truck 10. The prime mover may be configured to utilize a variety of fuels (e.g., gasoline, diesel, bio-diesel, ethanol, natural gas, etc.), according to various exemplary embodiments, and an energy storage device may store such fuel for use by the prime mover. According to an alternative embodiment, the prime mover includes one or more electric motors. The electric motors may consume electrical power from an on-board energy storage device (e.g., batteries, ultra-capacitors, etc.), from an on-board generator (e.g., an internal combustion engine, a fuel cell, etc.), from an external power source (e.g., overhead power lines, etc.), or still another source and provide power to the systems of the refuse truck 10.

In one embodiment, the prime mover provides power to various systems of refuse truck 10. By way of example, the prime mover may provide power to one or more tractive elements, shown as wheels 22, to move refuse truck 10. By way of another example, the prime mover may provide power to a pneumatic system, a hydraulic system, or still another system. A power take off unit may facilitate such power distribution.

As shown in FIG. 1, refuse truck 10 includes a cab, shown as cab 30, coupled to chassis 20. Cab 30 includes various components to facilitate operation of refuse truck 10 by an operator (e.g., a seat, a steering wheel, hydraulic controls, etc.). Cab 30 is positioned at a front end of refuse truck 10. In other embodiments, the cab is otherwise positioned.

Referring still to FIG. 1, refuse truck 10 includes a body assembly coupled to chassis 20. The body assembly includes a storage body, shown as body 40, that extends along the length of chassis 20 and is positioned behind cab 30. In other embodiments, body 40 is otherwise positioned. Refuse is stored within body 40 during transport from various waste receptacles within a municipality to a storage or processing facility (e.g., a landfill, an incineration facility, a recycling facility, etc.). A packing assembly may be positioned within body 40 to compact the loose refuse, thereby increasing the storage capacity of body 40. In one embodiment, body 40 includes an upper door to reduce the likelihood of loose refuse blowing out of body 40 during transport.

According to an exemplary embodiment, refuse truck 10 is a front-loading refuse vehicle. As shown in FIG. 1, an arm, shown as lift arm 50, is coupled to body 40. Lift arm 50 transfers refuse into body 40, according to an exemplary embodiment. An engagement member, shown as fork 52, is coupled to an end of lift arm 50 and configured to interface with a refuse collection bin to facilitate loading the refuse into body 40. It should be understood that refuse truck 10 includes a pair of lift arms 50 and a pair of forks 52, one of each disposed on either lateral side of body 40. In operation, refuse truck 10 is maneuvered (e.g., by an operator) into a loading position, where a refuse collection bin is in front of cab 30. Lift arms 50 and forks 52 are rotated forward, and refuse truck 10 is driven forward until forks 52 interface with the refuse container (e.g., as refuse truck 10 is driven forward, forks 52 are inserted into pockets on the sides of the refuse container). Lift arms 50 may be rotated backward until the refuse in the refuse container is deposited into body 40. The refuse container may be returned to the ground by again rotating lift arms 50 forward. Various actuators (e.g., hydraulic cylinders) may facilitate such operation. In other embodiments, refuse truck 10 is another type of refuse collection vehicle (e.g., a side-loading refuse vehicle, a rear-loading refuse vehicle, etc.).

Referring again to the exemplary embodiment shown in FIGS. 1-2, a tailgate, shown as tailgate 60, is rotatably coupled to body 40 with a pinned connection 62. An actuator, shown as lift cylinder 70, is coupled to body 40 and positioned to move tailgate 60, according to an exemplary embodiment. Extension and retraction of lift cylinder 70 rotates tailgate 60 about pinned connection 62 between an open position (e.g., a partially open position, a fully open position, etc.) and a closed position. As shown in FIGS. 1-2, lift cylinder 70 is a rod-fed hydraulic cylinder. In other embodiments, lift cylinder 70 is another type of device (e.g., another type of hydraulic cylinder, a pneumatic cylinder, an electric actuator, etc.). In still other embodiments, another type of actuator is positioned to move tailgate 60 (e.g., a rotational actuator, etc.).

According to the exemplary embodiment shown in FIGS. 1-2, the body assembly includes a prop assembly, shown as prop assembly 80, positioned to support tailgate 60 (e.g., in a partially open position). By way of example, an operator may support tailgate 60 in a partially open position in the course of performing maintenance on tailgate 60, to clean an inner surface of body 40, or to perform still other tasks. In one embodiment, prop assembly 80 is configured to selectively engage lift cylinder 70 to support tailgate 60.

Referring still to the exemplary embodiment shown in FIGS. 1-2, the body assembly includes a lock mechanism 90 configured to selectively secure tailgate 60 in the closed position. By way of example, tailgate 60 may be selectively secured in the closed position while refuse truck 10 is moving. By way of another example, an operator may wish to secure tailgate 60 in the closed position during a packing operation, where a packing assembly compresses loose refuse within body 40 against tailgate 60. Securing tailgate 60 reduces the packing forces that are imparted on lift cylinder 70, according to one embodiment. Securing tailgate 60 may also reduce the risk of inadvertently opening tailgate 60 during a packing operation. Actuation of lock mechanism 90 may be coordinated automatically (e.g., with a controller according to a lock mechanism control strategy) or occur upon user input.

Figure 3:
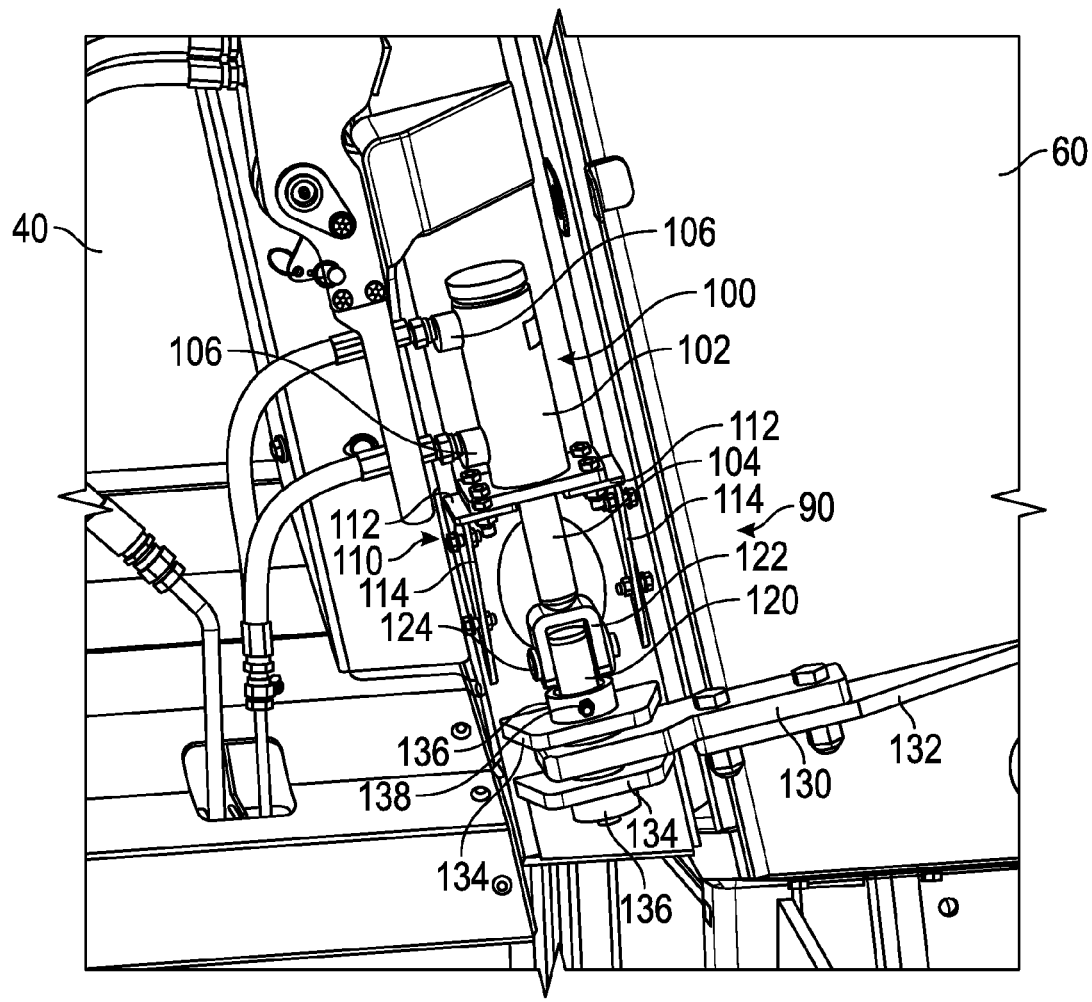
FIG. 3 is a perspective view of a lock mechanism for the tailgate of a refuse vehicle, according to an exemplary embodiment.

Referring next to FIG. 3, lock mechanism 90 includes an actuator, shown as lock cylinder 100. Lock cylinder 100 is positioned laterally outward of a sidewall of body 40, according to one embodiment, thereby improving serviceability (e.g., replacement of lock cylinder 100) and reducing the risk of damage to lock mechanism 90. As shown in FIG. 3, lock cylinder 100 is a hydraulic cylinder. In other embodiments, lock cylinder 100 is another type of device (e.g., a pneumatic cylinder, an electric actuator, etc.). In still other embodiments, another type of actuator is positioned to secure tailgate 60 (e.g., a rotational actuator, etc.). As shown in FIG. 3, lock cylinder 100 includes a cylinder body 102 and a cylinder rod 104. A working fluid (e.g., hydraulic oil) flows into and out of cylinder body 102 through ports 106, according to one embodiment. The working fluid actuates lock cylinder 100 to move (e.g., extend, retract, etc.) at least a portion of cylinder rod 104. In one embodiment, lock cylinder 100 includes a piston that is coupled to cylinder rod 104. The working fluid may engage (e.g., act upon, etc.) the piston to move cylinder rod 104.

According to the exemplary embodiment shown in FIG. 3, cylinder body 102 is fixed to body 40 with a bracket assembly, shown as bracket assembly 110. Bracket assembly 110 includes a pair of opposing lateral plates 112 and a pair of support gussets 114. As shown in FIG. 3, cylinder body 102 is coupled to the pair of opposing lateral plates 112 with a bolted connection, thereby facilitating the removal of lock cylinder 100 (e.g., for maintenance, etc.). The pair of support gussets 114 may be welded, bolted, adhesively secured, or otherwise coupled to body 40. A cover may be coupled to bracket assembly 110 to protect cylinder rod 104 or other components of lock mechanism 90 from debris.

As shown in FIG. 3, lock mechanism 90 further includes a locking pin, shown as pin 120. Pin 120 is a cylindrical rod, according to one embodiment. According to an alternative embodiment, pin 120 has another cross-sectional shape (e.g., hexagonal, rectangular, square, etc.). Pin 120 may be solid or may be tubular. According to the exemplary embodiment shown in FIG. 3, pin 120 is coupled to an end of cylinder rod 104 with a clevis 122 and a pin 124. As shown in FIG. 3, clevis 122 is coupled to an end of cylinder rod 104 and includes a pair of ears that receive pin 120 therebetween. Pin 124 extends laterally through apertures defined in the pair of ears and pin 120, thereby securing pin 120 to cylinder rod 104. Coupling pin 120 to cylinder rod 104 with clevis 122 and pin 124 may facilitate the replacement of pin 120 (e.g., for service or repair, etc.). In other embodiments, pin 120 is otherwise coupled to cylinder rod 104 (e.g., threaded into an end of cylinder rod 104, welded to cylinder rod 104, etc.). In still other embodiments, pin 120 is a portion of cylinder rod 104. By way of example, a portion of the cylinder rod may protrude through an aperture in a locking plate to selectively secure the tailgate in the closed position.

Referring still to FIG. 3, lock mechanism 90 includes a locking plate, shown as plate 130. Plate 130 is positioned laterally outward of a sidewall of body 40, according to one embodiment, thereby improving serviceability (e.g., replacement of plate 130) and reducing the risk of damage to lock mechanism 90. As shown in FIG. 3, plate 130 defines a locking aperture that receives pin 120 to selectively secure tailgate 60 in the closed position. According to an exemplary embodiment, plate 130 is coupled to tailgate 60. As shown in FIG. 3, a support gusset 132 is coupled to tailgate 60, and plate 130 is coupled to support gusset 132 with a bolted connection. In other embodiments, plate 130 is coupled directly to tailgate 60 (e.g., plate 130 is welded to tailgate 60). According to an exemplary embodiment, plate 130 rotates with tailgate 60. With tailgate in the closed position, plate 130 is disposed between a pair of shear plates 134 that facilitate selectively securing tailgate 60. As shown in FIG. 3, shear plates 134 are coupled to body 40 and define apertures that receive pin 120. Shear plates 134 place pin 120 in double shear, according to one embodiment, and distribute loading (e.g., due to a packing operation tending to open tailgate 60) into body 40. In other embodiments, lock mechanism 90 does not include shear plates 134. In still other embodiments, lock mechanism 90 includes more or fewer shear plates 134 (e.g., one shear plate, three shear plates to place pin 120 in triple shear, etc.). According to the embodiment shown in FIG. 3, a collar 136 is coupled to each shear plate 134. A grease fitting 138 is coupled to collar 136 to facilitate lubricating the movement of pin 120, according to one embodiment.

In operation, tailgate 60 is rotated into a closed position (e.g., with lift cylinder 70), and mechanism 90 selectively secures the position of tailgate 60. By way of example, lock cylinder 100 may be engaged such that cylinder rod 104 extends, thereby positioning pin 120 into the aperture defined by plate 130. Lock cylinder 100 is engaged automatically by a controller, according to one embodiment. The controller may include an input to receive information regarding the position of tailgate 60 and engage lock cylinder 100 as tailgate 60 reaches the closed position. In one embodiment, the controller receives information from a proximity sensor configured to provide a sensor signal as tailgate 60 reaches the closed position. By way of example, the proximity sensor may be coupled to body 40 or coupled to tailgate 60. In other embodiments, the controller receives sensor input from another type of sensor (e.g., a linear position sensor integrated within a tailgate lift cylinder, a rotational position sensor, etc.) positioned to provide sensor signals relating to the position of tailgate 60. In other embodiments, lock cylinder 100 is engaged after receiving user input. A user may provide such user input to a controller (e.g., by actuating a switch, etc.) configured to engage lock cylinder 100. By way of example, a user may press a "lock tailgate" button from within the cab, and the controller may engage lock cylinder 100 to selectively secure the position of tailgate 60. In other embodiments, lock cylinder 100 is manually engaged. Various hydraulic or pneumatic components may facilitate such automatic or manual operation of lock cylinder 100 (e.g., reservoirs, valves, lines, etc.).

Figure 4:
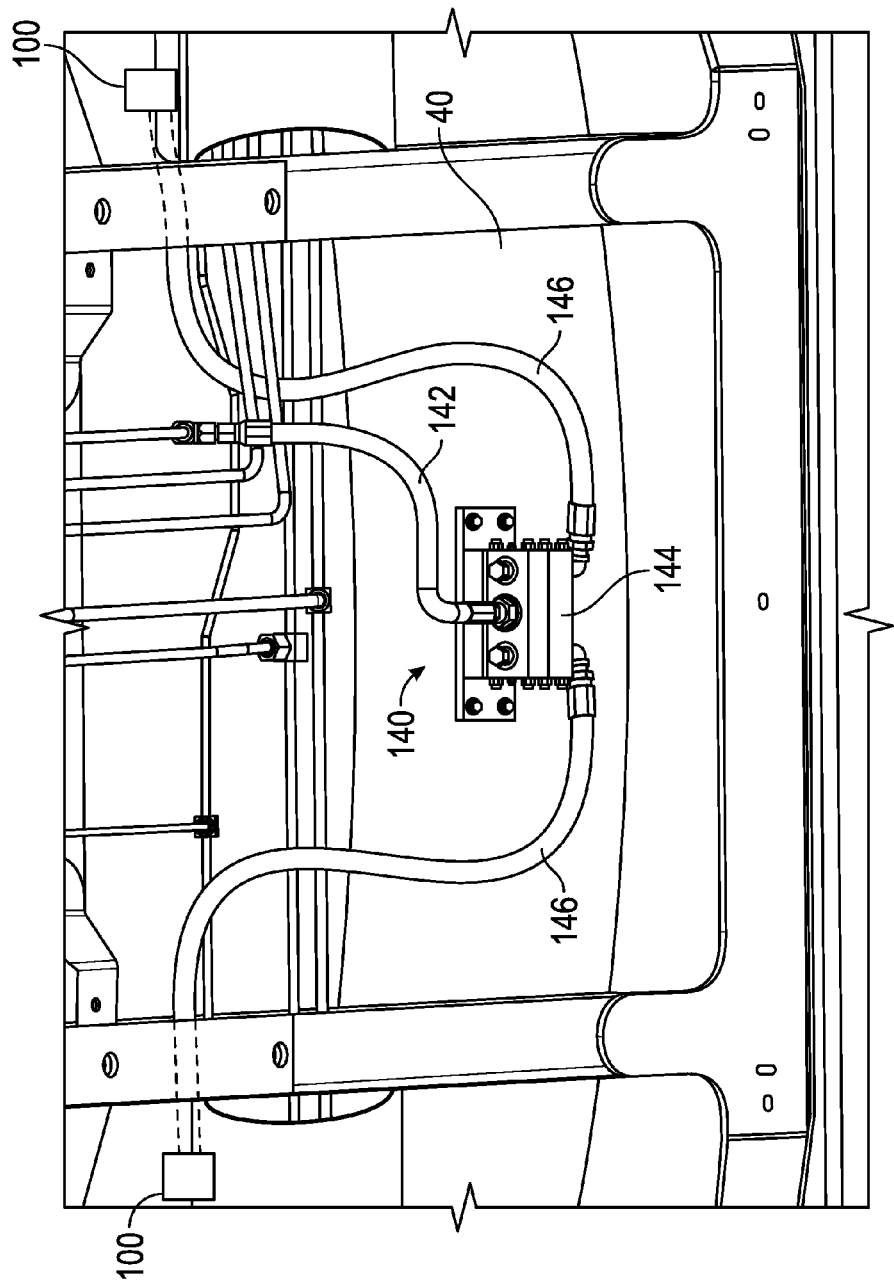
FIG. 4 is a perspective view of a plumbing assembly for lock mechanisms of a refuse vehicle, according to an exemplary embodiment.

As shown in FIG. 4, a pair of lock cylinders 100 are positioned on opposing lateral sides of body 40 and are engaged by a plumbing assembly 140. According to an exemplary embodiment, plumbing assembly 140 simultaneously engages both lock cylinders 100, thereby reducing the risk that a lock cylinder 100 on one side of body 40 may inadvertently remain disengaged. As shown in FIG. 4, plumbing assembly 140 includes a primary inlet line 142 that provides pressurized fluid (e.g., hydraulic oil, air, etc.) to a manifold 144. Manifold 144 separates flow from primary inlet line 142 between two lines 146, which provide pressurized fluid to lock cylinders 100.

Figure 5:
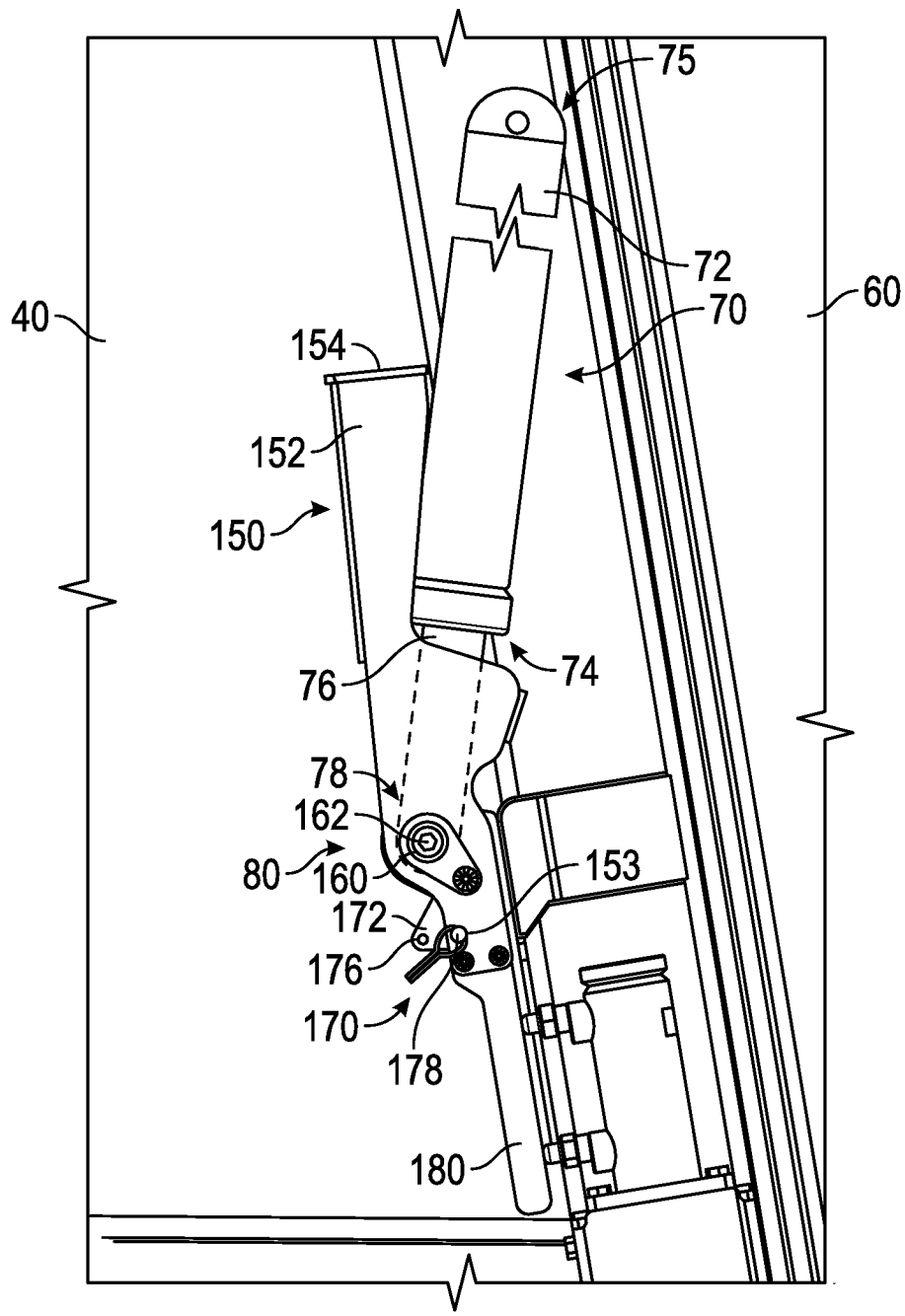
FIGS. 5-6 are side plan views of a prop assembly for the tailgate of a refuse vehicle, according to an exemplary embodiment.
Figure 6:
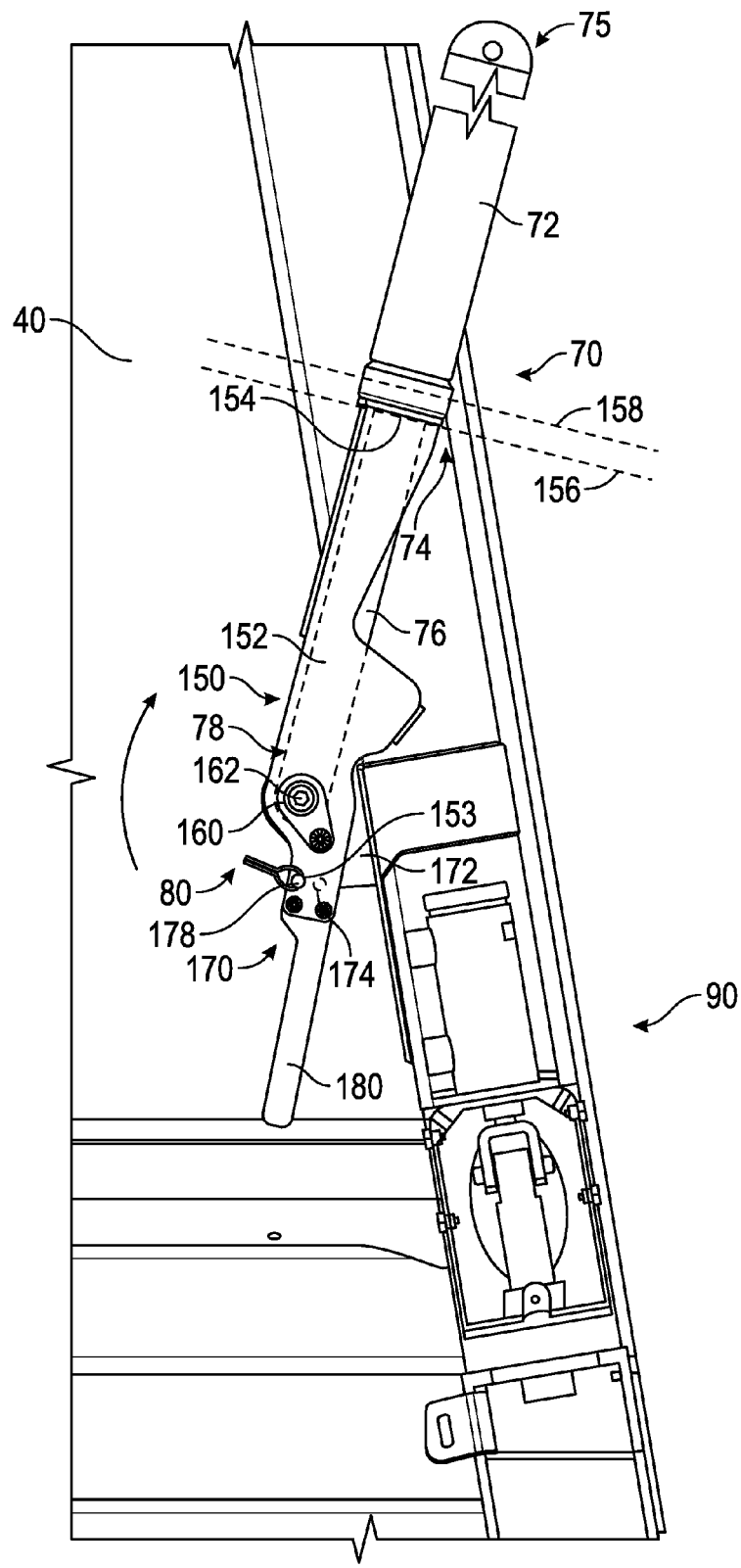

Referring next to FIG. 5-6, prop assembly 80 selectively engages lift cylinder 70 to support tailgate 60. In one embodiment, a vehicle (e.g., a refuse truck) includes two prop assemblies 80, one positioned on either lateral side of body 40. Including two prop assemblies 80 may reduce the likelihood of twisting tailgate 60 during a propping operation. As shown in FIG. 5, lift cylinder 70 includes a cylinder tube 72 having an inner tube end 74 and an outer tube end 75. Lift cylinder 70 also includes a rod 76 having an outer rod end 78 and an inner rod end disposed within cylinder tube 72. Cylinder tube 72 moves relative to rod 76 to rotate tailgate 60, according to an exemplary embodiment. In one embodiment, lift cylinder 70 includes a piston coupled to the inner rod end of rod 76. A working fluid (e.g., pressurized hydraulic oil) may engage the piston to extend or retract cylinder tube 72 relative to rod 76.

Prop assembly 80 includes a prop, shown as prop 150, that is rotatably coupled to body 40. According to an exemplary embodiment, prop 150 includes a sidewall 152 and an end wall 154. Prop 150 defines an interface surface configured to selectively engage cylinder tube 72. As shown in FIG. 5, outer rod end 78 and prop 150 are coupled to a lower portion of body 40. Coupling outer rod end 78 and prop 150 to a lower portion of body 40 facilitates direct operation of prop assembly 80 by an operator. By way of example, an operator standing alongside the refuse vehicle may support tailgate 60 in an open position by directly engaging prop 150 (i.e. prop 150 may be engaged without the use of tools, intermediate linkages, or other components). The operator may engage prop 150 without needing to raise tools overhead or climb onto the refuse vehicle. As shown in FIGS. 5-6, prop 150 is positioned laterally outward from body 40, thereby allowing an operator to prop open tailgate 60 without entering the space between tailgate 60 and body 40.

Referring still to FIGS. 5-6 prop 150 rotates about a pin 160 relative to body 40 between a disengaged position and a engaged position. As shown in FIG. 5, prop 150 is rotated into the disengaged position, where inner tube end 74 of cylinder tube 72 may extend downward past end wall 154 of prop 150. From the disengaged position shown in FIG. 5, prop 150 may be rotated into a engaged position shown in FIG. 6. In one embodiment, prop 150 is rotated rearward from the disengaged position to the engaged position (e.g., such that end wall 154 is positioned further toward a rear wall of body 40, clockwise for the driver's side of the refuse vehicle, counterclockwise for the passenger's side of the vehicle, etc.). According to an alternative embodiment, prop 150 is positioned rearward of lift cylinder 70 in the disengaged position and rotates forward (e.g., such that end wall 154 is positioned further away from a rear wall of body 40, counterclockwise for the driver's side of the refuse vehicle, clockwise for the passenger's side of the vehicle, etc.) into the engaged position.

As shown in FIG. 6, end wall 154 defines an interface surface that selectively engages inner tube end 74 of cylinder tube 72. By way of example, the interface surface may be a planar surface defined by end wall 154. In other embodiments, end wall 154 includes a mating feature (e.g., a cup, a depression, a projection, etc.) shaped to engage inner tube end 74 of cylinder tube 72. The mating feature may reduce the risk of prop 150 disengaging cylinder tube 72.

Figure 7:
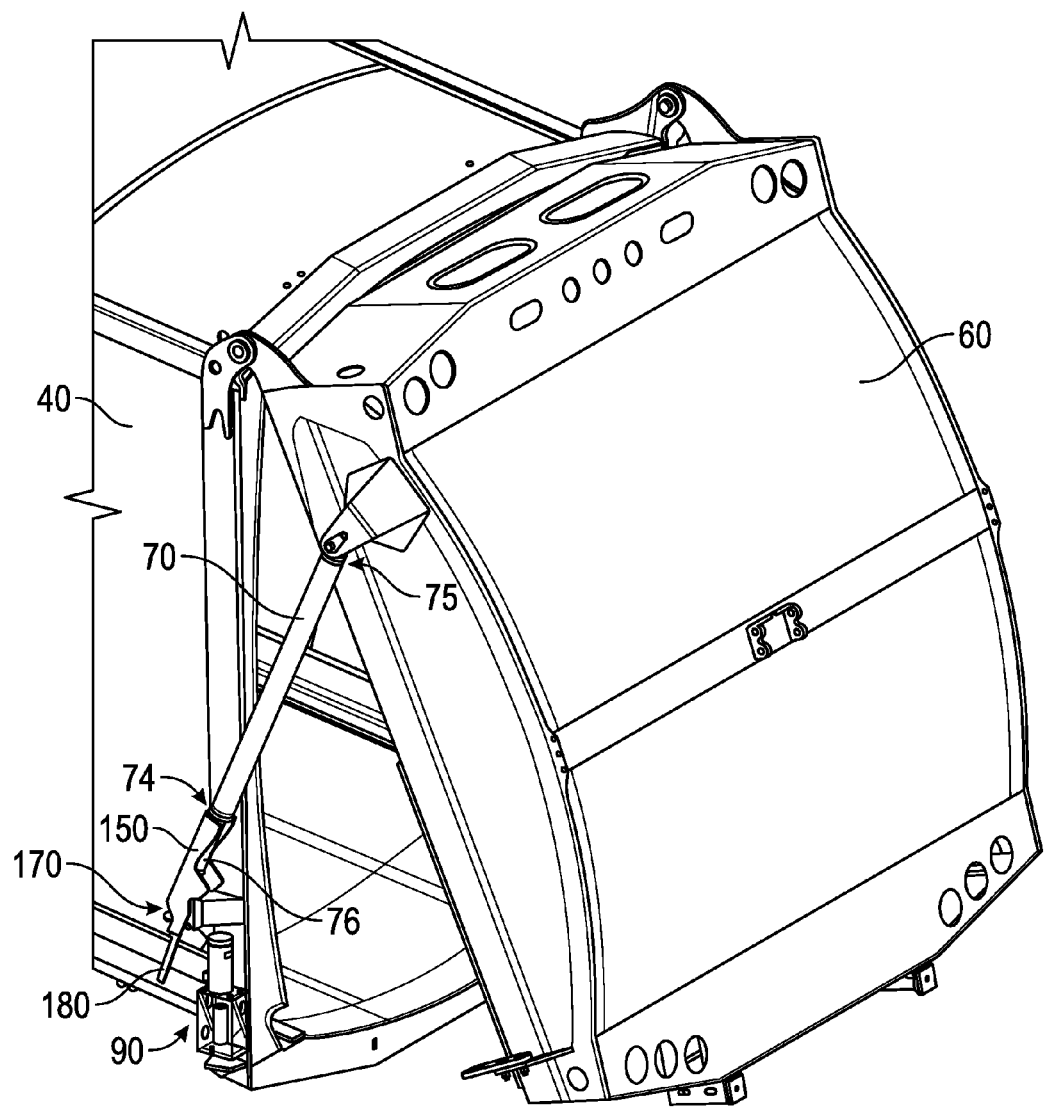
FIG. 7 is a rear perspective view of a prop assembly for the tailgate of a refuse vehicle, according to an exemplary embodiment.

Referring to FIGS. 5-7, prop 150 may be actuated to support tailgate 60. In one embodiment, prop 150 is oriented in the disengaged position shown in FIG. 5 during normal operation of the vehicle. With prop 150 in the disengaged position, lift cylinder 70 may rotate tailgate 60 between a closed position, a partially open position, and a fully open position. By way of example, lift cylinder 70 may rotate tailgate 60 into the closed position during a packing operation or to transport refuse within body 40. Tailgate 60 may be propped open to facilitate a maintenance operation or to remove refuse from body 40. In one embodiment, tailgate 60 is opened with lift cylinder 70. As tailgate 60 rotates upward, lift cylinder 70 extends, cylinder tube 72 travels upward, and a portion of rod 76 is exposed. Tailgate 60 may be further rotated until inner tube end 74 of cylinder tube 72 travels beyond a prop position 156 to an elevated position 158, thereby creating clearance for prop 150. With inner tube end 74 of cylinder tube 72 in elevated position 158, prop 150 may be rotated into the engaged position, as shown in FIGS. 6-7. Lift cylinder 70 may be thereafter retracted (e.g., using hydraulic pressure, by venting high pressure fluid used to open tailgate 60, etc.) such that inner tube end 74 of cylinder tube 72 travels downward toward outer rod end 78 of rod 76. In one embodiment, inner tube end 74 moves downward to prop position 156, where an end surface of inner tube end 74 engages (e.g., contacts) the interface surface defined by end wall 154. Prop 150 thereby supports cylinder tube 72 and provides a support force that props open tailgate 60.

In one embodiment, end wall 154 is positioned to prop tailgate 60 open about 15 degrees. In another embodiment, end wall 154 is positioned further from pin 160, thereby supporting cylinder tube 72 in a relatively higher position and propping tailgate 60 further open. In still another embodiment, end wall 154 is positioned closer to pin 160, thereby supporting cylinder tube 72 in a relatively lower position and propping tailgate 60 less open. As shown in FIGS. 5-7, end wall 154 is fixed to sidewalls 152. In other embodiments, at least a portion of prop 150 is adjustable such that the position of end wall 154 may be varied (e.g., by an operator). Such variable position may allow an operator, customer, or other user to change the prop angle (e.g., the angle between tailgate 60 and a rear wall of body 40, the angle between tailgate 60 in the closed and propped positions, etc.) without replacing prop 150.

Referring again to FIGS. 5-6, sidewalls 152 of prop 150 and outer rod end 78 of rod 76 each define an aperture that receives pin 160. In one embodiment, outer rod end 78 includes a fitting (e.g., a tie rod end) having an aperture that receives pin 160. As shown in FIGS. 5-6, prop 150 and lift cylinder 70 are positioned to rotate about a common pivot axis 162. In one embodiment, common pivot axis 162 extends through a centerline of pin 160. Positioning prop 150 and lift cylinder 70 to rotate about common pivot axis 162 improves the rotational timing of prop assembly 80 with lift cylinder 70, simplifies the design of prop 150, improves serviceability, and reduces the need for additional brackets and pins to support prop 150 and lift cylinder 70.

In one embodiment, a prop retainer 170 is configured to secure the position of prop 150 and reduces the risk of inadvertent engagement or disengagement of prop 150. As shown in FIG. 5, prop retainer 170 includes a bracket 172 that is coupled to body 40. Prop 150 and outer rod end 78 of lift cylinder 70 may be also coupled to body 40 with bracket 172. According to the exemplary embodiment shown in FIGS. 5-6, bracket 172 is coupled to a lower portion of body 40 such that an operator standing alongside the refuse vehicle may operate prop retainer 170 (i.e. prop retainer 170 may be engaged without the use of tools, intermediate linkages, or other components).

Sidewall 152 of prop 150 defines an aperture, shown as retainer opening 153, according to an exemplary embodiment. Retainer opening 153 is positioned to interface with prop retainer 170 to secure the position of prop 150. As shown in FIG. 5, sidewall 152 defines retainer opening 153 at a first end of prop 150, and end wall 154 is positioned at an opposing second end of prop 150.

Referring to FIGS. 5-6, bracket 172 defines a first aperture 174 and a second aperture 176 that define a pair of locations in which prop retainer 170 may secure prop 150. As shown in FIGS. 5-6, prop retainer 170 includes a fastener, shown as retainer pin 178, that is configured to selectively secure the position of prop 150. According to an exemplary embodiment, the first aperture in bracket 172 is positioned to align with retainer opening 153 in sidewall 152 when prop 150 is in the disengaged position and the second aperture in bracket 172 is positioned to align with retainer opening 153 in sidewall 152 when prop 150 is in the engaged position. Prop 150 may be selectively secured in the disengaged position by inserting retainer pin 178 though retainer opening 153 and first aperture 174, as shown in FIG. 5, or selectively secured in the engaged position by inserting retainer pin 178 though retainer opening 153 and second aperture 176, as shown in FIG. 6. Selectively securing prop 150 in the engaged or disengaged position reduces the risk of inadvertently disengaging or engaging prop 150, respectively. In other embodiments, prop retainer 170 includes a plurality of prop retainers that may be inserted through retainer opening 153 and first aperture 174 or second aperture 176. By way of example, a pair of actuators may be positioned orthogonal to sidewall 152 and be configured to extend a rod end into retainer opening 153 and first aperture 174 or second aperture 176 to secure the position of prop 150. Such actuators may be controlled manually or automatically as part of a prop control system (e.g., a controller may engage each actuator automatically or after receiving user input). According to alternative embodiments, prop retainer includes still another type of fastener to selectively secure the position of prop 150 (e.g., a ball and detent assembly, a spring-biased pin assembly, a latch, etc.).

In other embodiments, bracket 172 defines more or fewer apertures to define a different number of locations in which prop retainer 170 may secure prop 150. As shown in FIG. 5, the apertures are circular. According to an alternative embodiment, bracket 172 defines apertures having another shape (e.g., rectangular, etc.). According to still another alternative embodiment, bracket 172 defines a slot such that prop retainer 170 may secure prop 150 in various locations. Prop 150 may be selectively secured to bracket 172 with a threaded stud and a nut (e.g., a threaded knob, a wing nut, etc.) positioned such that tightening the nut limits movement of prop 150.

In one embodiment, an operator may support tailgate 60 in an open position by directly engaging prop 150. As shown in FIGS. 5-6, prop 150 includes a handle, shown as handle 180, that facilitates such direct engagement. An operator may rotate prop 150 between the disengaged position and the engaged position by pulling or pressing on handle 180. In other embodiments, prop 150 does not include handle 180, and an operator may rotate prop 150 by pulling or pressing on one of the sidewalls 152.

According to an alternative embodiment, prop 150 automatically supports tailgate 60 in an open position. In one embodiment, prop 150 is biased into the engaged position such that tailgate 60 is propped open by default. By way of example, prop 150 may have a center of gravity that is positioned further rearward than pin 160, the weight of prop 150 providing an over-centering force that biases prop 150 into the engaged position. By way of another example, prop 150 may be biased into the engaged position with a resilient member (e.g., a spring). In another embodiment, prop 150 is biased into the disengaged position such that tailgate 60 is not propped open by default (e.g., prop 150 may have a center of gravity that is positioned forward of pin 160, prop 150 may be biased into the disengaged position with a resilient member, etc.).

In another embodiment, prop 150 is rotated between the engaged position and the disengaged position with an actuator that is engaged by a prop controller. In one embodiment, the prop controller receives user input and engages the actuator to move prop 150. By way of example, the user input may be to rotate prop 150 into the engaged position, to rotate prop 150 into the disengaged position, or to prop open tailgate 60. An operator may independently control the operation of lift cylinder 70.

According to still another embodiment, the prop controller is configured to engage both lift cylinder 70 and an actuator positioned to rotate prop 150. Automatically or upon receiving user input, the prop controller may engage lift cylinder 70 to open tailgate 60. The prop controller may thereafter engage the actuator to rotate prop 150 into the engaged position and engage lift cylinder 70 or open a relief valve to lower tailgate 60 until cylinder tube 72 interfaces with prop 150. The prop controller may receive inputs from various sensors to facilitate such operation (e.g., a rotational position sensor coupled to tailgate 60, a linear position sensor coupled to at least one of lift cylinder 70 and the actuator positioned to rotate prop 150, etc.).

The construction of the body assembly, lock mechanism, and prop assembly is intended to reduce the overall weight of the refuse vehicle relative to vehicles having traditional prop assemblies and lock mechanisms. Weight reduction due to the design and construction of these components allows for an increase in the maximum refuse carrying capacity without exceeding gross vehicle weight regulations imposed on some roadways. A reduced number of components simplifies fixture designs and increases the ease of manufacturing relative to traditional prop assemblies and lock mechanisms.

The construction and arrangements of the refuse vehicle, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes, and omissions may also be made in the design, operating conditions and arrangement of the various exemplary embodiments without departing from the scope of the present invention.

What is claimed is:

1. A body assembly for a vehicle, comprising:
    a storage body;
    a tailgate rotatably coupled to the storage body;
    an actuator including a cylinder tube having an outer tube end coupled to the tailgate and a rod having an outer rod end coupled to the storage body, wherein extension and retraction of the actuator moves the tailgate between an open position and a closed position;
    a prop including (a) a sidewall that defines an aperture at a first end of the prop and (b) an end wall positioned at an opposing second end of the prop, the end wall defining an interface surface configured to selectively engage the cylinder tube, wherein the outer rod end and the prop are rotatably coupled to a lower portion of the storage body such that an operator standing alongside the vehicle may support the tailgate in the open position by directly engaging the prop; and
    a prop retainer including a bracket coupled to the lower portion of the storage body, the bracket defining a first aperture positioned to align with the aperture in the sidewall of the prop when the prop is in an engaged position and a second aperture positioned to align with the aperture in the sidewall of the prop when the prop is in a disengaged position, wherein the prop retainer is configured to secure the position of the prop.

2. The body assembly of claim 1, wherein the prop and the actuator are positioned to rotate about a common pivot axis.

3. The body assembly of claim 1, further comprising a lock mechanism configured to selectively secure the tailgate in the closed position.

4. The body assembly of claim 3, wherein the lock mechanism includes a lock actuator coupled to the storage body and a locking plate coupled to the tailgate.

5. The body assembly of claim 4, wherein the lock actuator and the locking plate are positioned laterally outward of a sidewall of the storage body.

6. The body assembly of claim 5, wherein the lock mechanism includes a locking pin, and wherein the locking plate defines a locking aperture that receives the locking pin to selectively secure the tailgate in the closed position.

7. The body assembly of claim 6, further comprising a shear plate positioned at least one of above and below the locking plate when the tailgate is selectively reconfigured into the closed position, the shear plate defining a shear aperture positioned to align with the locking aperture to cooperatively receive the locking pin.

8. The body assembly of claim 1, wherein the end wall is shaped to correspond with the cylinder tube.

9. The body assembly of claim 1, wherein the prop includes a handle positioned to facilitate direct engagement of the prop.

10. The body assembly of claim 1, wherein the prop is biased into at least one of the engaged position and the disengaged position.

11. A body assembly for a vehicle, comprising:
    a storage body;
    a tailgate rotatably coupled to the storage body;
    an actuator including a cylinder tube having an outer tube end coupled to the tailgate and a rod having an outer rod end coupled to the storage body, wherein extension and retraction of the actuator moves the tailgate between an open position and a closed position; and
    a prop including (a) an end wall positioned at a first end of the prop that selectively engages the actuator and (b) a sidewall that defines an aperture positioned at an opposing second end of the prop to engage a prop retainer, the prop retainer including a bracket coupled to a lower portion of the storage body to secure the position of the prop, the bracket defining a first aperture positioned to align with the aperture in the sidewall of the prop when the prop is in an engaged position and a second aperture positioned to align with the aperture in the sidewall of the prop when the prop is in a disengaged position;

wherein the outer rod end and the prop are rotatably coupled to the lower portion of the storage body such that an operator standing alongside the vehicle may prop the tailgate in the open position by directly engaging the prop; and wherein the prop and the actuator are positioned to rotate about a common pivot axis.

12. The body assembly of claim 11, further comprising a lock mechanism configured to selectively secure the tailgate in the closed position, wherein the lock mechanism includes a lock actuator coupled to the storage body and a locking plate coupled to the tailgate.

13. The body assembly of claim 12, wherein the lock actuator and the locking plate are positioned laterally outward of the storage body.

14. The body assembly of claim 13, wherein the lock mechanism includes a locking pin, and wherein the locking plate defines a locking aperture that receives the locking pin to selectively secure the tailgate in the closed position.

15. A vehicle, comprising:
 a chassis;
 a storage body coupled to the chassis;
 a tailgate rotatably coupled to the storage body;
 an actuator including a cylinder tube having an outer tube end coupled to the tailgate and a rod having an outer rod end coupled to the storage body, wherein extension and retraction of the actuator moves the tailgate between an open position and a closed position;
 a prop including (a) a sidewall that defines an aperture at a first end of the prop and (b) an end wall positioned at an opposing second end of the prop, the end wall defining an interface surface configured to selectively engage the cylinder tube, wherein the outer rod end and the prop are rotatably coupled to a lower portion of the storage body such that an operator standing alongside the vehicle may support the tailgate in the open position by directly engaging the prop; and
 a prop retainer including a bracket coupled to the lower portion of the storage body, the bracket defining a first aperture positioned to align with the aperture in the sidewall of the prop when the prop is in an engaged position and a second aperture positioned to align with the aperture in the sidewall of the prop when the prop is in a disengaged position, wherein the prop retainer is configured to secure the position of the prop.

16. The vehicle of claim 15, wherein the prop and the actuator are positioned to rotate about a common pivot axis.

17. The vehicle of claim 15, further comprising a lock mechanism configured to selectively secure the tailgate in the closed position.

18. The vehicle of claim 17, wherein the lock mechanism includes a lock actuator coupled to the storage body and a locking plate coupled to the tailgate.

19. The vehicle of claim 18, wherein the lock actuator and the locking plate are positioned laterally outward of a sidewall of the storage body.

20. The vehicle of claim 19, wherein the lock mechanism includes a locking pin, and wherein the locking plate defines a locking aperture that receives the locking pin to selectively secure the tailgate in the closed position.

* * * * *